(12) United States Patent
Liu et al.

(10) Patent No.: US 11,987,096 B2
(45) Date of Patent: May 21, 2024

(54) INDIRECT HEAT PUMP SYSTEM

(71) Applicant: AIR INTERNATIONAL THERMAL SYSTEMS R&D (SHANGHAI) CO., LTD., Shanghai (CN)

(72) Inventors: Qi Liu, Shanghai (CN); Zhaokai Yu, Shanghai (CN); Yu Zhao, Shanghai (CN); Duo Wu, Shanghai (CN); Xiaohua Qu, Shanghai (CN); Jingyang Mu, Shanghai (CN); Guangze Hong, Shanghai (CN)

(73) Assignee: AIR INTERNATIONAL THERMAL SYSTEMS R&D (SHANGHAI) CO., LTD. (CN)

( * ) Notice: Subject to any disclaimer, the term of this patent is extended or adjusted under 35 U.S.C. 154(b) by 0 days.

(21) Appl. No.: 18/257,008

(22) PCT Filed: Oct. 14, 2021

(86) PCT No.: PCT/CN2021/123810
§ 371 (c)(1),
(2) Date: Jun. 12, 2023

(87) PCT Pub. No.: WO2022/127328
PCT Pub. Date: Jun. 23, 2022

(65) Prior Publication Data
US 2024/0042828 A1 Feb. 8, 2024

(30) Foreign Application Priority Data

Dec. 18, 2020 (CN) .................. 202011507091.X

(51) Int. Cl.
*B60H 1/00* (2006.01)
(52) U.S. Cl.
CPC ..... *B60H 1/00899* (2013.01); *B60H 1/00485* (2013.01)

(58) Field of Classification Search
CPC . B60H 1/00899; B60H 1/00485; F25B 41/20; F25B 13/00; F25B 2400/13
See application file for complete search history.

(56) References Cited

U.S. PATENT DOCUMENTS

| 6,324,860 | B1 * | 12/2001 | Maeda | .................. F24F 5/001 62/96 |
| 6,751,972 | B1 | 6/2004 | Jungwirth | |

(Continued)

FOREIGN PATENT DOCUMENTS

| CA | 3149757 A1 * | 3/2021 | ......... F24D 19/1006 |
| CN | 2393048 Y | 8/2000 | |

(Continued)

OTHER PUBLICATIONS

Office Action in counterpart Chinese Patent Application No. 202011507091.X dated Jan. 4, 2022.

(Continued)

*Primary Examiner* — Kun Kai Ma
(74) *Attorney, Agent, or Firm* — Kim IP Law Group LLC

(57) ABSTRACT

An indirect heat pump system includes a refrigerant unit, a cold water handling unit, and a hot water handling unit. A cold water inlet of the cold water handling unit communicates with an evaporator; a cold water outlet of the cold water handling unit communicates with the evaporator; the cold water handling unit is connected to a plurality of loads in parallel. A hot water inlet of the hot water handling unit communicates with a condenser; a hot water outlet of the hot water handling unit communicates with the condenser; the hot water handling unit is connected to the loads in parallel; and a plurality of hot water two-way valves are disposed in pipelines of the hot water handling unit and are configured to control the on and off of the hot water in the loads.

8 Claims, 8 Drawing Sheets

(56) References Cited

U.S. PATENT DOCUMENTS

| | | | | |
|---|---|---|---|---|
| 2012/0125029 A1* | 5/2012 | Moreau | ............... | F25B 29/00 |
| | | | | 62/238.7 |
| 2013/0283843 A1* | 10/2013 | Takenaka | ............. | F25B 13/00 |
| | | | | 62/324.6 |
| 2014/0360218 A1* | 12/2014 | Takenaka | ............. | F25B 13/00 |
| | | | | 62/324.6 |
| 2018/0023818 A1* | 1/2018 | Takayama | ............. | F25B 1/10 |
| | | | | 62/238.6 |
| 2019/0353401 A1* | 11/2019 | Hikone | ................. | F24H 4/02 |
| 2020/0256589 A1* | 8/2020 | Takenaka | ............. | F25B 13/00 |

FOREIGN PATENT DOCUMENTS

| | | | | |
|---|---|---|---|---|
| CN | 103129346 A | 6/2013 | | |
| CN | 105757836 A | 7/2016 | | |
| CN | 207230983 U | 4/2018 | | |
| CN | 108944332 A | 12/2018 | | |
| CN | 110006120 A | 7/2019 | | |
| CN | 110497768 A | 11/2019 | | |
| CN | 110525168 A | 12/2019 | | |
| CN | 111183277 A | 5/2020 | | |
| CN | 111251832 A | 6/2020 | | |
| CN | 111746218 A | 10/2020 | | |
| CN | 112622563 A | 4/2021 | | |
| CN | 112622563 A * | 4/2021 | ......... | B60H 1/00007 |
| JP | S63-159123 A | 7/1988 | | |
| JP | H07276975 A | 10/1995 | | |
| WO | WO-2022183839 A1 * | 9/2022 | .............. | F24F 11/63 |

OTHER PUBLICATIONS

International Search Report in International Application No. PCT/CN2021/123810, dated Jan. 20, 2022.

Written Opinion in International Application No. PCT/CN2021/123810, dated Jan. 20, 2022.

* cited by examiner

INDIRECT HEAT PUMP SYSTEM

CROSS-REFERENCE TO RELATED APPLICATION(S)

This is a national stage application filed under 35 U.S.C. § 371 based on International Patent Application No. PCT/CN2021/123810, filed Oct. 14, 2021, which claims priority to Chinese Patent Application No. 202011507091.X filed with the China National Intellectual Property Administration (CNIPA) on Dec. 18, 2020, the disclosure of which is incorporated herein by reference in its entirety.

TECHNICAL FIELD

The present application relates to the field of heat exchanging technology, for example, an indirect heat pump system.

BACKGROUND

For a traditional vehicle, cooling depends on an air conditioning system and heating depends on the heat dissipated by an engine. In comparison, on a new energy electric vehicle, temperature control is usually performed by carrying a heat pump system or a PTC heater. However, the efficiency of the PTC heater is always less than 1, consuming much energy capacity of batteries, greatly reducing the driving range of the vehicle, and aggravating the range anxiety of a customer.

As users raise their requirements for the vehicle driving range increasingly, a variety of heat pump systems have been developed. Because of the advantages of high efficiency and energy conservation, the heat pump systems are increasingly applied to new energy electric vehicles.

Nonetheless, heat-pump air conditioners of new energy electric vehicles have various restrictions as described below.

The heat-pump air conditioners on the new energy electric vehicles mostly use direct heat pump systems. In a direct heat pump system, an evaporator in an HVAC of a passenger compartment is used for cooling the passenger compartment; a condenser in the HVAC is used for heating the passenger compartment; and the evaporator, the condenser, and a plate heat exchanger for cooling a battery pack serve as refrigerating medium components and form one system containing multiple heat exchangers. Such a heat pump system conveys a refrigerating medium to loads directly, contributing to relatively high thermal efficiency and relatively high system energy efficiency. However, the direct heat pump system has a large number of heat exchangers, resulting in multiple modes of the refrigerating medium circuit, the complex configuration of refrigerating medium pipelines, long pipelines, a large number of electromagnetic shut-off valves in the refrigerating medium circuit, and a large number of throttle valves in the refrigerating medium circuit.

The high cost of the direct heat pump system increases the difficulty of applying the direct heat pump system to a new energy electric vehicle. The complexity of the refrigerating medium pipelines raises risks including the leakage of a refrigerant, the oil return of a compressor, and the low cleanliness in the system, shortens the lifetime of the heat pump system, and adds the maintenance cost. Long refrigerating medium pipelines and multiple heat exchangers cause the refrigerant charge in the system to be significantly larger than the refrigerant charge in a traditional air conditioning system, increasing the purchase cost for the refrigerant, proposing a higher requirement for the safety of the refrigerant, and further limiting selectable refrigerant types.

SUMMARY

The present application discloses an indirect heat pump system.

Embodiments of the present application disclose an indirect heat pump system. The indirect heat pump system includes a refrigerant unit, a cold water handling unit, and a hot water handling unit. The refrigerant unit includes a compressor, a condenser, a throttle valve, and an evaporator; an outlet of the compressor communicates with a first inlet of the condenser; a first outlet of the condenser communicates with a first inlet of the evaporator through the throttle valve; and a first outlet of the evaporator communicates with an inlet of the compressor. A cold water inlet of the cold water handling unit communicates with a second outlet of the evaporator; a cold water outlet of the cold water handling unit communicates with a second inlet of the evaporator; the cold water handling unit is connected to a plurality of loads in parallel; and a plurality of cold water two-way valves are disposed in pipelines of the cold water handling unit and are configured to control the on and off of the cold water in the loads. A hot water inlet of the hot water handling unit communicates with a second outlet of the condenser; a hot water outlet of the hot water handling unit communicates with a second inlet of the condenser; the hot water handling unit is connected to the loads in parallel; and a plurality of hot water two-way valves are disposed in pipelines of the hot water handling unit and are configured to control the on and off of the hot water in the loads. Here the hot water two-way valves correspond to the cold water two-way valves in a one-to-one manner and are interlocked with the cold water two-way valves in terms of on and off states.

Figure 1:
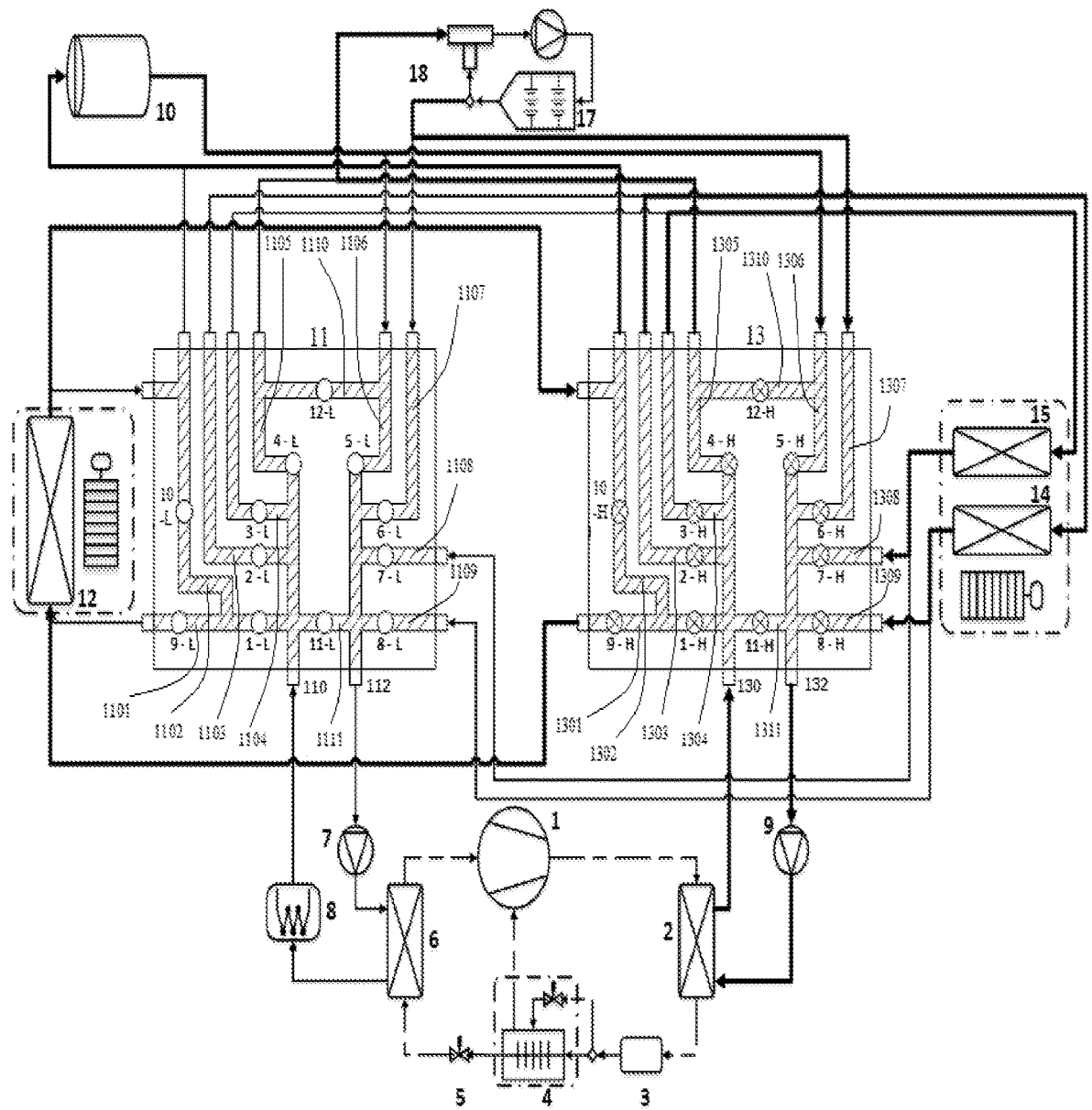
FIG. 1 is a diagram of an indirect heat pump system according to embodiments of the present application.

REFERENCE LIST 1 compressor
2 condenser 5 throttle valve
6 evaporator
4 vapor injection heat exchanger
3 receiver and dryer
11 cold water handling unit
13 hot water handling unit
12 first load
10 second load
14 third load
15 fourth load
17 fifth load
8 PTC heater
7 cold water pump
9 hot water pump
18 battery water temperature regulating valve
1-L first cold water two-way valve
2-L second cold water two-way valve
3-L third cold water two-way valve
4-L fourth cold water two-way valve
5-L fifth cold water two-way valve
6-L sixth cold water two-way valve
7-L seventh cold water two-way valve
8-L eighth cold water two-way valve
9-L ninth cold water two-way valve
10-L tenth cold water two-way valve
11-L eleventh cold water two-way valve
12-L twelfth cold water two-way valve
1-H first hot water two-way valve
2-H second hot water two-way valve
3-H third hot water two-way valve
4-H fourth hot water two-way valve
5-H fifth hot water two-way valve
6-H sixth hot water two-way valve
7-H seventh hot water two-way valve
8-H eighth hot water two-way valve
9-H ninth hot water two-way valve
10-H tenth hot water two-way valve
11-H eleventh hot water two-way valve
12-H twelfth hot water two-way valve
1101 first cold water branch
1102 second cold water branch
1103 third cold water branch
1104 fourth cold water branch
1105 fifth cold water branch
1106 sixth cold water branch
1107 seventh cold water branch
1108 eighth cold water branch
1109 ninth cold water branch
1110 tenth cold water branch
1111 eleventh cold water branch
1301 first hot water branch
1302 second hot water branch
1303 third hot water branch
1304 fourth hot water branch
1305 fifth hot water branch
1306 sixth hot water branch
1307 seventh hot water branch
1308 eighth hot water branch
1309 ninth hot water branch
1310 tenth hot water branch
1311 eleventh hot water branch
110 cold water inlet
112 cold water outlet
130 hot water inlet
132 hot water outlet

DETAILED DESCRIPTION

Given various shortcomings of direct heat pump systems, some feasible explorations on indirect heat pump systems have been conducted in the field of heat-pump air conditioners of vehicles with an expectation of simplifying the design of refrigerating medium circuits and improving the shortcomings of direct heat pump systems. However, in most of the researches on indirect heat pump systems, the indirect heating of a passenger compartment is implemented through replacing an interior cooler used for heating with a water-cooled condenser with a heater core (HTRC); and such a heating manner has not overcome the shortcomings of the preceding direct heat pump systems.

Additionally, the major challenge for the application and promotion of indirect heat pump systems lies in the design of coolant circuits. Since a vehicle has various load requirements for the heat-pump air conditioner of the vehicle, the number of loads is large and the configuration of loads is flexible based on the vehicle model configuration (for example, a single HVAC, or a front HVAC and a rear HVAC), the heating manner of an HVAC (through a PTC heater or a heater core), and the special vehicle configuration (for example, the cooling of a glove box or a vehicle-mounted refrigerated container). Moreover, different types of loads usually have different requirements. For example, the passenger compartment and the battery pack need to be both cooled by a cold source and heated by a heat source, but the motor only needs to be cooled. Accordingly, the coolant circuit is extremely complex, resulting in poor system stability and high application difficulty.

To cope with the preceding circumstances in the related art, embodiments of the present application provide an indirect heat pump system.

Embodiments of the present application are described hereinafter in conjunction with drawings.

In the description of the present application, terms "joined", "connected" and "secured" are to be understood in a broad sense unless otherwise expressly specified and limited. For example, the term "connected" may refer to "securely connected", "detachably connected" or "integrated", may refer to "mechanically connected" or "electrically connected" or may refer to "connected directly", "connected indirectly through an intermediary" or "connected inside two components" or "interaction relations between two components". For those of ordinary skill in the art, specific meanings of the preceding terms in the present application may be construed according to actual circumstances.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

The indirect heat pump system provided in embodiments of the present application is described hereinafter in conjunction with drawings and embodiments.

In general, a direct heat pump system refers to a heat pump system in which the refrigerant exchanges heat with loads directly. Different from the refrigerant in the direct heat pump system, the refrigerant in an indirect heat pump system does not exchange heat with loads directly. For example, one manner for an indirect heat pump system is that a coolness carrier is used as a medium for heat exchange. In another example, an indirect heat pump system may use the refrigerant to exchange heat with a coolness carrier such as a coolant and then use the coolness carrier to cool or heat the air in the passenger compartment.

The present application provides an indirect heat pump system. As shown in FIG. 1, the indirect heat pump system includes a refrigerant unit, a cold water handling unit 11, and a hot water handling unit 13. The refrigerant unit is able to provide coolness for a coolant in the cold water handling unit 11 so that the coolant in the cold water handling unit 11 stays at a low temperature; moreover, the refrigerant unit is able to provide heat for a coolant in the hot water handling unit 13 so that the coolant in the hot water handling unit 13 stays at a high temperature.

In this embodiment, the refrigerant unit includes a compressor 1, a condenser 2, a throttle valve and an evaporator 6; an outlet of the compressor 1 communicates with a first inlet of the condenser 2; a first outlet of the condenser 2 communicates with a first inlet of the evaporator 6 through the throttle valve 5; and a first outlet of the evaporator 6 communicates with an inlet of the compressor 1. Refrigerating mediums are circulated in pipelines of the refrigerant unit, facilitating that the evaporator 6 of the refrigerant unit cools the coolant in the cold water handling unit 11 and heats the coolant in the hot water handling unit 13. In this embodiment, the coolant in the cold water handling unit 11 is cold water, and the coolant in the hot water handling unit 13 is hot water. It is to be understood that a coolant in this embodiment may be another refrigerating medium and may be selected by those skilled in the art according to actual situations.

Cold water refers to the water whose temperature is lower than the temperature of hot water.

In one embodiment, the refrigerant unit further includes a vapor injection heat exchanger (VPI) 4 communicated between the throttle valve 5 and the condenser 2. An outlet at a vapor injection side of the vapor injection heat exchanger 4 communicates with a vapor injection port of the compressor 1. In this embodiment, the refrigerant unit further includes a receiver and dryer (RD) 3 communicated between the condenser 2 and the vapor injection heat exchanger 4.

In this embodiment, a cold water inlet 110 of the cold water handling unit 11 communicates with a second outlet of the evaporator 6, and a cold water outlet 112 of the cold water handling unit 11 communicates with a second inlet of the evaporator 6. The evaporator 6 can serve as a cold source to supplement coolness to the cold water in the cold water handling unit 11. The cold water handling unit 11 is connected to a plurality of loads in parallel, and a plurality of cold water two-way valves are disposed in pipelines of the cold water handling unit 11 and are configured to control the on and off of the cold water in the loads so that the cold water handling unit 11 is able to provide cold water for each of the loads separately to perform cooling.

A hot water inlet 130 of the hot water handling unit 13 communicates with a second outlet of the condenser 2, and a hot water outlet 132 of the hot water handling unit 13 communicates with a second inlet of the condenser 2. The condenser 2 can serve as a heat source to supplement heat to the hot water in the hot water handling unit 13. The cold water handling unit 13 is connected to a plurality of loads in parallel, and a plurality of cold water two-way valves are disposed in pipelines of the cold water handling unit 13 and are configured to control the on and off of the cold water in the loads so that the cold water handling unit 13 is able to provide cold water for each of the loads separately to perform heating. In one embodiment, the hot water two-way valves correspond to the cold water two-way valves in a one-to-one manner and are interlocked with the cold water two-way valves in terms of on and off states. In this case, the cold source in the indirect heat pump system and the heat source in the indirect heat pump system are prevented from mixing with each other; the loads can switch between the cold source and the heat source safely and reliably; and thus customer requirements are satisfied.

The arrangement in which the hot water two-way valves correspond to the cold water two-way valves in a one-to-one manner refers to that positions of the hot water two-way valves in the hot water handling unit 13 are arranged in the same manner as positions of the cold water two-way valves in the cold water handling unit 11.

The arrangement in which the hot water two-way valves are interlocked with the cold water two-way valves in terms of on and off states refers to that the on and off states of one of the hot water two-way valves are interlocked with the on and off states of one cold water two-way valve corresponding to the hot water two-way valve in a relative position.

The on-off interlocking refers to that when one of two two-way valves turns on, the other one of the two two-way valves turns off, and that when one of two two-way valves turns off, the other one of the two two-way valves turns on.

The arrangement in which one hot water two-way valve corresponds to one hot water two-way valve in a relative position refers to that the relative position of the hot water two-way valve in the hot water handling unit 13 is the same as the relative position of the cold water two-way valve in the cold water handling unit 11.

In this embodiment, the loads include a first load 12, a second load 10, a third load 14, a fourth load 15, and a fifth load 17. A radiator, a drive motor, an interior cooler, an interior heater, and a battery pack that are in a new energy electric vehicle serve as the first load 12, the second load the third load 14, the fourth load 15, and the fifth load 17 respectively and communicate with the cold water handling unit 11.

The refrigerant unit in this embodiment includes only the compressor 1, the condenser 2, the evaporator 6, the throttle valve 5, the vapor injection heat exchanger 4, and the receiver and dryer 3 so that the refrigerant unit can be extremely compact and completely isolated from a passenger compartment, thus greatly reducing the size of refrigerant pipelines. The cooling and heating in the passenger compartment may be completed simultaneously using the interior cooler and the interior heater with a coolant (the cold water or the hot water) serving as a coolness carrier or a heat carrier. Accordingly, only the coolant enters the passenger compartment while the refrigerant pipelines are isolated from the passenger compartment.

In one embodiment, the indirect heat pump system further includes a cold water pump 7 disposed between the cold water outlet 112 and the second inlet of the evaporator 6 and configured to convey the cold water and enable the cold water to circulate between the cold water handling unit 11 and the loads. In one embodiment, the indirect heat pump system further includes a PTC heater 8 disposed between the cold water inlet 110 and the second outlet of the evaporator 6. The PTC heater serves as a compensation heat source for heating the cold water, helping raise the temperature of the cold water in the low-temperature environment and thus enhancing the energy efficiency of the indirect heat pump system. This is more effective than compensating heat to the hot water and expands the low-temperature range in which the indirect heat pump system operates.

For example, the cold water handling unit 11 includes a plurality of cold water branches (that is, a plurality of inflow cold water branches) communicating with the cold water inlet 110 and a plurality of cold water branches (that is, a plurality of outflow cold water branches) communicating with the cold water outlet 112. The cold water branches communicate with the loads and are configured to introduce the cold water to the loads. Two ends of a first cold water branch 1101 communicate with the cold water inlet 110 and an inlet of the first load 12 (that is, the radiator) respectively. One end of a second cold water branch 1102 communicates with the first cold water branch 1101, and the other end of the second cold water branch 1102 communicates with an outlet of the first load 12 (that is, the radiator) and an inlet of the second load 10 (that is, the drive motor). Two ends of a third cold water branch 1103 communicate with the cold water inlet 110 and an inlet of the third load 14 (that is, the interior cooler) respectively. Two ends of a fourth cold water branch 1104 communicate with the cold water inlet 110 and an inlet of the fourth load 15 (that is, the interior heater) respectively. Two ends of a fifth cold water branch 1105 communicate with the cold water inlet 110 and an inlet of the fifth load 17 (that is, the battery pack) respectively. Two ends of a sixth cold water branch 1106 communicate with the cold water outlet 112 and an outlet of the second load 10 (that is, the drive motor) respectively. Two ends of a seventh cold water branch 1107 communicate with the cold water outlet 112 and an outlet of the fifth load 17 (that is, the drive motor) respectively. Two ends of an eighth cold water branch 1108 communicate with the cold water outlet 112 and an outlet of the fourth load 15 (that is, the interior heater) respectively. Two ends of a ninth cold water branch 1109 communicate with the cold water outlet 112 and an outlet of the third load 14 (that is, the interior cooler) respectively. In this case, the cold water can be circularly introduced to each load.

In one embodiment, a first cold water two-way valve 1-L and a ninth cold water two-way valve 9-L are disposed on the first cold water branch 1101; a joint between the first cold water branch 1101 and the second cold water branch 1102 is located between the first cold water two-way valve 1-L and the ninth cold water two-way valve 9-L; a tenth cold water two-way valve 10-L is disposed on the second cold water branch 1102; a second cold water two-way valve 2-L is disposed on the third cold water branch 1103; a third cold water two-way valve 3-L is disposed on the fourth cold water branch 1104; a fourth cold water two-way valve 4-L is disposed on the fifth cold water branch 1105; a fifth cold water two-way valve 5-L is disposed on the sixth cold water branch 1106; a sixth cold water two-way valve 6-L is disposed on the seventh cold water branch 1107; a seventh cold water two-way valve 7-L is disposed on the eighth cold water branch 1108; an eighth cold water two-way valve 8-L is disposed on the ninth cold water branch 1109; the fifth cold water branch 1105 communicates with the sixth cold water branch 1106 through a tenth cold water branch 1110; a twelfth cold water two-way valve 12-L is disposed on the tenth cold water branch 1110; the first cold water branch 1101 communicates with the ninth cold water branch 1109 through an eleventh cold water branch 1111; and an eleventh cold water two-way valve 11-L is disposed on the eleventh cold water branch 1111.

In one embodiment, the indirect heat pump system further includes a hot water pump 9 disposed between the hot water outlet 112 and the second inlet of the condenser 2. The hot water pump 9 is configured to convey hot water and enable the hot water to circulate between the hot water handling unit 13 and the loads.

Similarly, the hot water handling unit 13 includes a plurality of hot water branches (that is, a plurality of inflow hot water branches) communicating with the hot water inlet 130 and a plurality of hot water branches (that is, a plurality of outflow hot water branches) communicating with the hot water outlet 132. The hot water branches communicate with the loads and are configured to introduce the hot water to the loads. Two ends of a first hot water branch 1301 communicate with the hot water inlet 130 and the inlet of the first load 12 (that is, the radiator) respectively. One end of a second hot water branch 1302 communicates with the first hot water branch 1301, and the other end of the second hot water branch 1302 communicates with the outlet of the first load 12 (that is, the radiator) and the inlet of the second load 10 (that is, the drive motor). Two ends of a third hot water branch 1303 communicate with the hot water inlet 130 and the inlet of the third load 14 (that is, the interior cooler) respectively. Two ends of a fourth hot water branch 1304 communicate with the hot water inlet 130 and the inlet of the fourth load 15 (that is, the interior heater) respectively. Two ends of a fifth hot water branch 1305 communicate with the hot water inlet 130 and the inlet of the fifth load 17 (that is, the battery pack) respectively. Two ends of a sixth hot water branch 1306 communicate with the hot water outlet 132 and the outlet of the second load 10 (that is, the drive motor) respectively. Two ends of a seventh hot water branch 1307 communicate with the hot water outlet 132 and the outlet of the fifth load 17 (that is, the drive motor) respectively. Two ends of an eighth hot water branch 1308 communicate with the hot water outlet 132 and the outlet of the fourth load 15 (that is, the interior heater) respectively. Two ends of a ninth hot water branch 1309 communicate with the hot water outlet 132 and the outlet of the third load 14 (that is, the interior cooler) respectively. In this case, the hot water can be circularly introduced to each load.

In one embodiment, a first hot water two-way valve 1-H and a ninth hot water two-way valve 9-H are disposed on the first hot water branch 1301; a joint between the first hot water branch 1301 and the second hot water branch 1302 is located between the first hot water two-way valve 1-H and the ninth hot water two-way valve 9-H; a tenth hot water two-way valve 10-H is disposed on the second hot water branch 1302; a second hot water two-way valve 2-H is disposed on the third hot water branch 1303; a third hot water two-way valve 3-H is disposed on the fourth hot water branch 1304; a fourth hot water two-way valve 4-H is disposed on the fifth hot water branch 1305; a fifth hot water two-way valve 5-H is disposed on the sixth hot water branch 1306; a sixth hot water two-way valve 6-H is disposed on the seventh hot water branch 1307; a seventh hot water two-way valve 7-H is disposed on the eighth hot water branch 1308; an eighth hot water two-way valve 8-H is disposed on the ninth hot water branch 1309; the fifth hot water branch 1305 communicates with the sixth hot water branch 1306 through a tenth hot water branch 1310; a twelfth hot water two-way valve 12-H is disposed on the tenth hot water branch 1310; the first hot water branch 1301 communicates with the ninth hot water branch 1309 through an eleventh hot water branch 1311; and an eleventh hot water two-way valve 11-H is disposed on the eleventh hot water branch 1311.

In the present application, the branch design and the valve configuration in the cold water handling unit 11 and the hot water handling unit 13 diversify combination manners of the communication loads and satisfy various requirements for the thermal management of an entire vehicle. Here the cold source or the heat source can be connected to the loads in parallel so that the battery pack and the passenger compartment are cooled simultaneously, and the cold source or the heat source can be connected to the loads in series so that the radiator serving as the first load 12 sequentially cools the drive motor serving as the second load 10 and the refrigerating medium of the condenser 2. When all the loads are short-circuited, the self-circulation of the cold water handling unit 11 is performed. When the loads are connected in series to form small circulations, the case where the heat generated by the drive motor is used for heating the battery pack or the passenger compartment is implemented.

Additionally, the present application further implements the expandability of the number of communication loads so that the configuration of the loads is greatly flexible. The number of loads of the cold water handling unit 11 or the number of loads of the hot water handling unit 13 may be increased or decreased flexibly based on the vehicle model configuration (for example, a single HVAC, or a front HVAC and a rear HVAC), the heating manner of an HVAC (through the PTC heater 8 or a heater core), and the special vehicle configuration (for example, the cooling of a glove box or a vehicle-mounted refrigerated container) so as to implement the expansion of the indirect heat pump system.

The present application discloses an indirect heat pump system. With a compact structure, the indirect heat pump system enables the loads to switch between the cold source and the heat source safely and reliably. Accordingly, the function of cooling and heating is implemented and customer requirements are satisfied.

The present application has the beneficial effects below.

The present application provides an indirect heat pump system. The indirect heat pump system includes a refrigerant unit, a cold water handling unit, and a hot water handling unit. A cold water inlet of the cold water handling unit communicates with a second outlet of an evaporator in the refrigerant unit. A cold water outlet of the cold water handling unit communicates with a second inlet of the evaporator. The cold water handling unit is connected to a plurality of loads in parallel for providing a cold source for the loads. A hot water inlet of the hot water handling unit communicates with a second outlet of a condenser in the refrigerant unit. A hot water outlet of the hot water handling unit communicates with a second inlet of the condenser. The hot water handling unit is connected to the loads in parallel for providing a heat source for the loads. A plurality of cold water two-way valves are disposed in pipelines of the cold water handling unit and are configured to control the on and off of the cold water in the loads. A plurality of hot water two-way valves are disposed in pipelines of the hot water handling unit and are configured to control the on and off of the hot water in the loads. The hot water two-way valves correspond to the cold water two-way valves in a one-to-one manner and are interlocked with the cold water two-way valves in terms of on and off states. Through the on and off of the cold water two-way valves and the on and off of the hot water two-way valves, the indirect heat pump system can provide the cold source or the heat source for each of the loads separately based on the requirement of each load so that each load is in the suitable operating temperature. Moreover, the arrangement in which the hot water two-way valves correspond to the cold water two-way valves in a one-to-one manner and are interlocked with the cold water two-way valves in terms of on and off states prevents the cold source in the indirect heat pump system and the heat source in the indirect heat pump system from mixing with each other so that the loads can switch between the cold source and the heat source safely and reliably, and thus customer requirements are satisfied.

In this embodiment, the indirect heat pump system may be set to the operating modes below.

Cooling Mode

Figure 2:
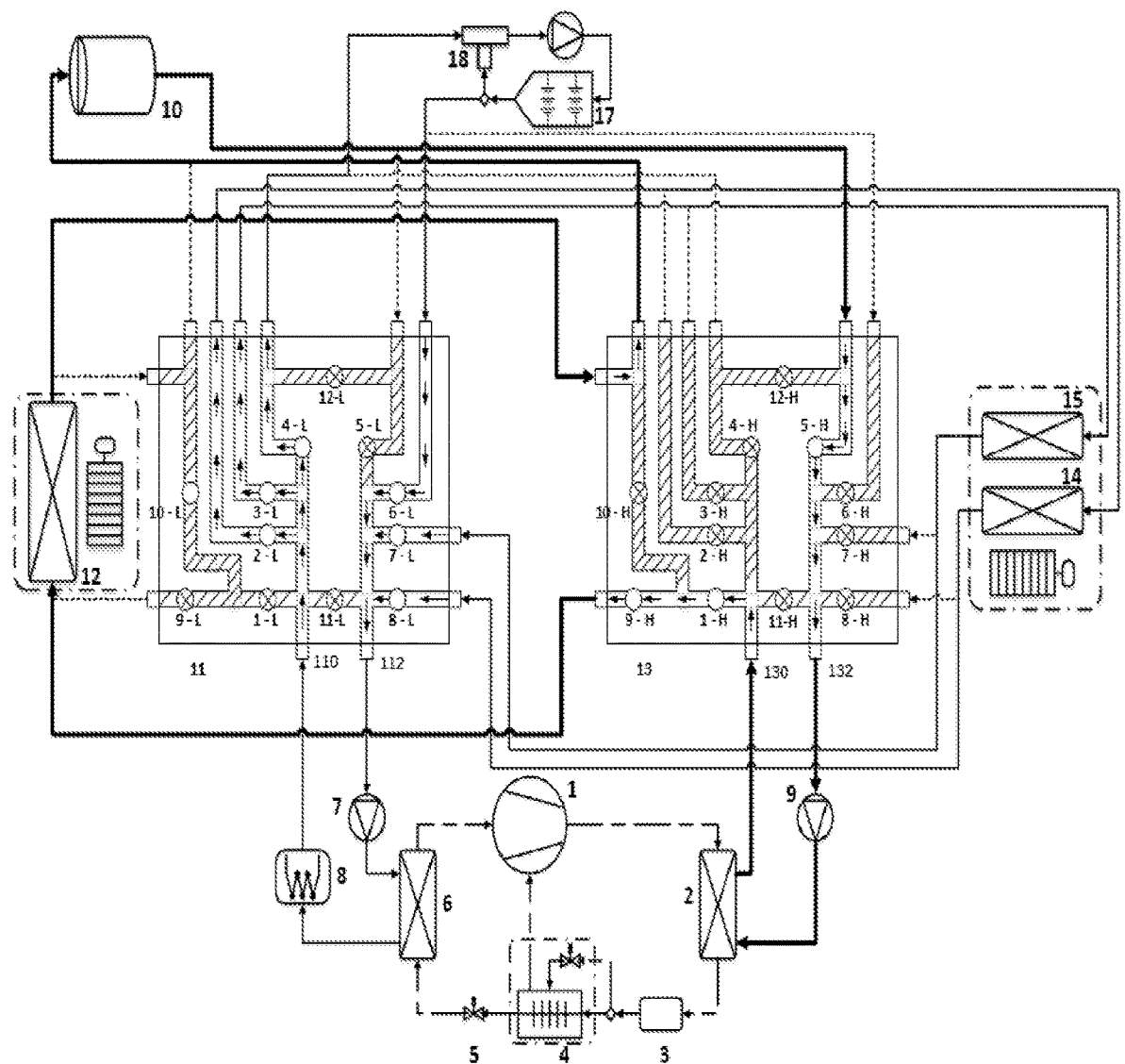
FIG. 2 is a diagram illustrating a cooling mode of the indirect heat pump system according to embodiments of the present application.

As shown in FIG. 2, in a cooling mode, the high-pressure, high-temperature gaseous refrigerant exhausted from the compressor 1 flows into pipelines on pipelines at one side in the condenser 2 to perform condensation and heat exchange, achieving the effect of heating the coolant in pipelines at the other side in the condenser 2 (the refrigerant flows through pipelines at one side in the condenser 2 and the coolant flows through pipelines at the other side in the condenser 2). The condensed refrigerant flows out of the condenser 2 and enters the receiver and dryer 3 to implement gas-liquid separation, ensuring that all the refrigerant flowing out of the receiver and dryer 3 is liquid. The refrigerant is divided into two parts at an outlet of the receiver and dryer 3. One part of the refrigerant reaches an inlet at the vapor injection side of the vapor injection heat exchanger 4 along a branch and flows into the vapor injection side of the vapor injection heat exchanger 4 to absorb heat after isenthalpic throttling, and the refrigerant turning to a medium-pressure, overheating state flows out of the vapor injection heat exchanger 4 and reaches the vapor injection port of the compressor 1 to enter the compressor 1. The other part of the refrigerant directly reaches the other side of the vapor injection heat exchanger 4 along a main path to release heat; and the refrigerant turning to a high-pressure, overcooling stage flows out of the vapor injection heat exchanger 4, reaches an inlet of the throttle valve 5, and flows into pipelines at one side in the evaporator 6 to perform evaporation and absorb heat after isenthalpic throttling, thus achieving the effect of cooling the coolant in pipelines at the other side in the evaporator 6. Finally, the low-temperature, overheating refrigerant flowing out of the evaporator 6 returns to a gas-absorption port of the compressor 1 to start the next circulation.

In the cooling mode, the coolant circuit may be divided into the high-temperature coolant and the low-temperature coolant based on the coolant temperature. The high-temperature coolant heated by the condenser 2 communicates with the radiator (that is, the first load 12) and the drive motor (that is, the second load 10) separately through the hot water handling unit 13 so as to take away the heat released by the condensation of the refrigerant in the condenser 2 and the heat released by the drive motor. The low-temperature coolant cooled by the evaporator 6 communicates with the interior cooler (that is, the third load 14), the interior heater (that is, the fourth load 15), and the battery pack (that is, the fifth load 17) separately through the cold water handling unit 11. With the coolant cooled by the evaporator 6 conveyed to the interior cooler, the interior heater, and the battery pack, the effect of cooling the battery and the air in the compartment is achieved.

In FIG. 2, continuous arrows inside the hot water handling unit 13 and inside the cold water handling unit 11 indicate a flow path of the coolant.

In the hot water handling unit 13, the coolant is introduced to the condenser 2 by the hot water pump 9 so as to absorb the heat of condensation released by the refrigerant at the other side of the condenser 2. The heated coolant flows in from the hot water inlet 130 of the hot water handling unit 13. The high-temperature coolant in the hot water handling unit 13 flows into the radiator (that is, the first load 12) after passing through the first hot water two-way valve 1-H and the ninth hot water two-way valve 9-H. After being cooled by the radiator (that is, the first load 12), the coolant reaches the inlet of the drive motor and then flows out after cooling the drive motor. The high-temperature coolant flowing out of the drive motor flows into the sixth hot water branch 1306 from the outlet of the second load 10, then flows out from the hot water outlet 132 after passing through the fifth hot water two-way valve 5-H, and then returns to an inlet of the hot water pump 9 to start the next circulation.

In the cold water handling unit 11, the coolant introduced by the cold water pump 7 to the evaporator 6 is cooled by the refrigerant at the other side of the evaporator 6. The cooled coolant passes through the PTC heater 8 and reaches the cold water inlet 110 to flow in. In the cooling mode, the PTC heater 8 does not work. After flowing into the cold water handling unit 11, the coolant is divided into three parts. A first part of the coolant passes through the second cold water two-way valve 2-L and flows into the interior cooler from the inlet of the third load 14 to cool the air in the compartment. A second part of the coolant passes through the third cold water two-way valve 3-L and flows into the interior heater from the inlet of the fourth load 15 to cool the air in the compartment. A third part of the coolant passes through the fourth cold water two-way valve 4-L and flows into the battery pack from the inlet of the fifth load 17 to cool batteries. In this case, a battery water temperature regulating valve 18 controls the water temperature at the inlet of the battery pack by regulating the bypass flow. The coolant flowing out of the interior cooler, the coolant flowing out of the interior heater, and the coolant flowing out of the battery pack pass through the third load 14, the fourth load 15, and the fifth load 17 respectively, return to the cold water handling unit 11, and then merge together after passing through the eighth cold water two-way valve 8-L, the seventh cold water two-way valve 7-L, and the sixth cold water two-way valve 6-L respectively. Then the merged coolant flows out from the cold water outlet 112 and returns to an inlet of the cold water pump 7 to start the next circulation.

First Heating Mode

Figure 3:
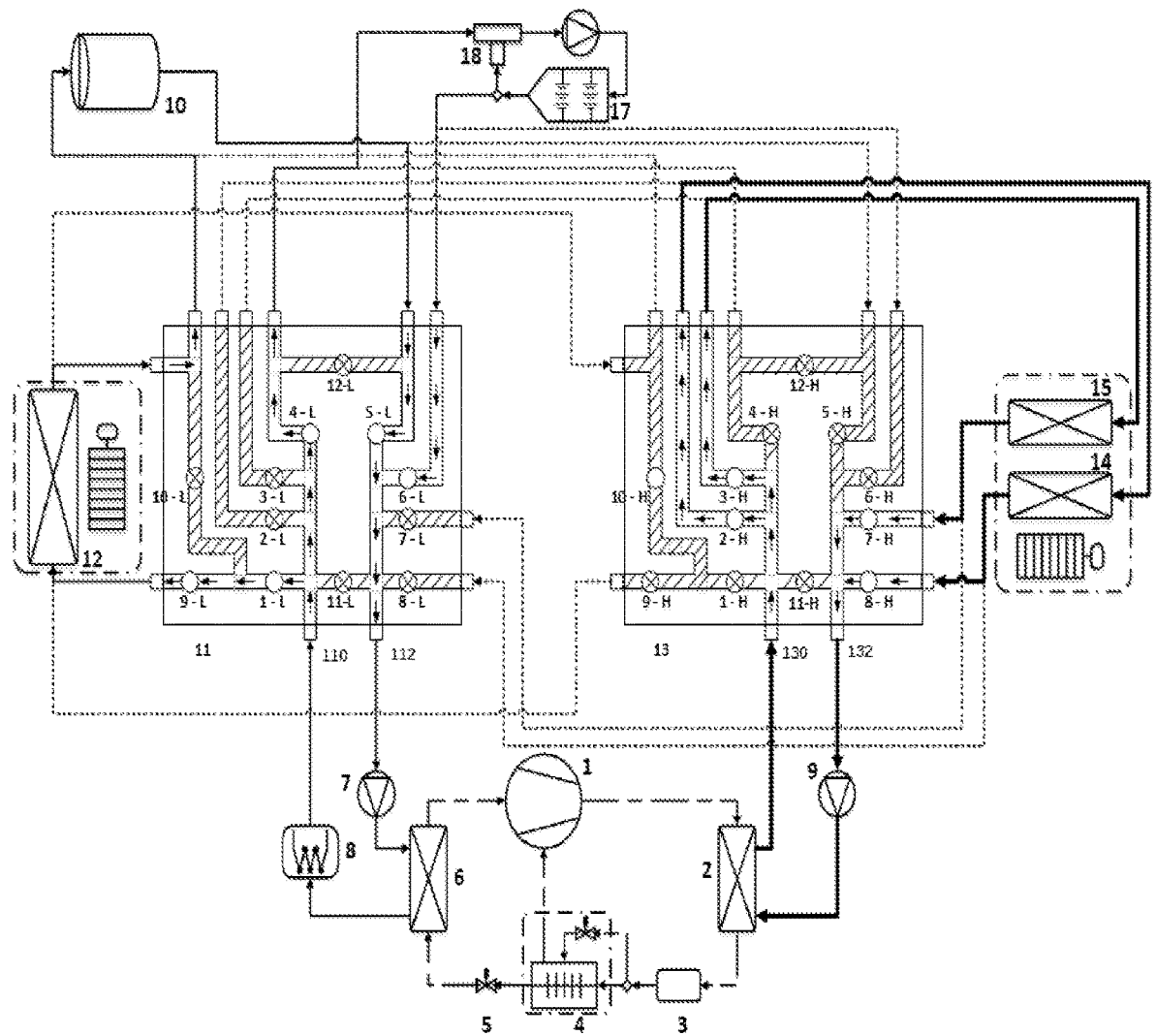
FIG. 3 is a diagram illustrating a first heating mode of the indirect heat pump system according to embodiments of the present application.

As shown in FIG. 3, the refrigerant unit in a first heating mode is the same as the refrigerant unit in the cooling mode, while the cold water handling unit 11 and the hot water handling unit 13 need to be reorganized. For example, the on and off states of cold water two-way valves in the cold water handling unit 11 are adjusted, and the on and off states of hot water two-way valves in the hot water handling unit 13 are adjusted.

In the hot water handling unit 13, the coolant introduced by the hot water pump 9 to pipelines at one side in the condenser 2 absorbs the heat of condensation of the refrigerant in pipelines at the other side of the condenser 2. The heated coolant flows into the hot water handling unit 13 from the hot water inlet 130. The coolant in the hot water handling unit 13 is divided into two parts. One part of the coolant flows into the interior cooler from the inlet of the third load 14 to heat the air in the compartment. The other part of the coolant passes through the third hot water two-way valve 3-H and flows into the interior heater 15 from the inlet of the fourth load 15 to heat the air in the compartment. The coolant flowing out of the interior heater and the coolant flowing out of the interior heater pass through the outlet of the third load 14 and the outlet of the fourth load 15 respectively, return to the hot water handling unit 31, and then merge together after passing through the eighth hot water two-way valve 8-H and the seventh hot water two-way valve 7-H. Then the merged coolant flows out from the hot water outlet 132 and finally returns to the inlet of the hot water pump 9 to start the next circulation.

In the cold water handling unit 11, the coolant is introduced by the cold water pump 7 to pipelines at one side in the evaporator 6. After the heat of the coolant is absorbed by the refrigerant in pipelines at the other side in the evaporator 6, the temperature of the coolant lowers. The coolant passes through the PTC heater 8 and reaches the cold water inlet 110 of the cold water handling unit 11 to flow in. In the first heating mode, the PTC heater 8 does not work. The coolant in the cold water handling unit 11 is divided into two parts. One part of the coolant passes through the first cold water two-way valve 1-L and the ninth cold water two-way valve 9-L sequentially and flows into the radiator from the inlet of the first load 12 to absorb the heat in the environment; and then the coolant flows into the cold water handling unit 11 from the outlet of the first load 12, then flows out from the inlet of the second load 10, and reaches the inlet of the drive motor to absorb the heat of the drive motor. The other part of the coolant passes through the fourth cold water two-way valve 4-L and flows into the battery pack from the inlet of the fifth load 17 to absorb the heat of the battery pack. The coolant flowing out of the drive motor and the coolant flowing out of the battery pack pass through the outlet of the second load 10 and the outlet of the fifth load 17 respectively, return to the cold water handling unit 11, and then merge together after passing through the fifth cold water two-way valve 5-L and the sixth cold water two-way valve 6-L. Then the merged coolant flows out from the cold water outlet 112 and finally returns to the inlet of the cold water pump 7 to start the next circulation.

Second Heating Mode

Figure 4:
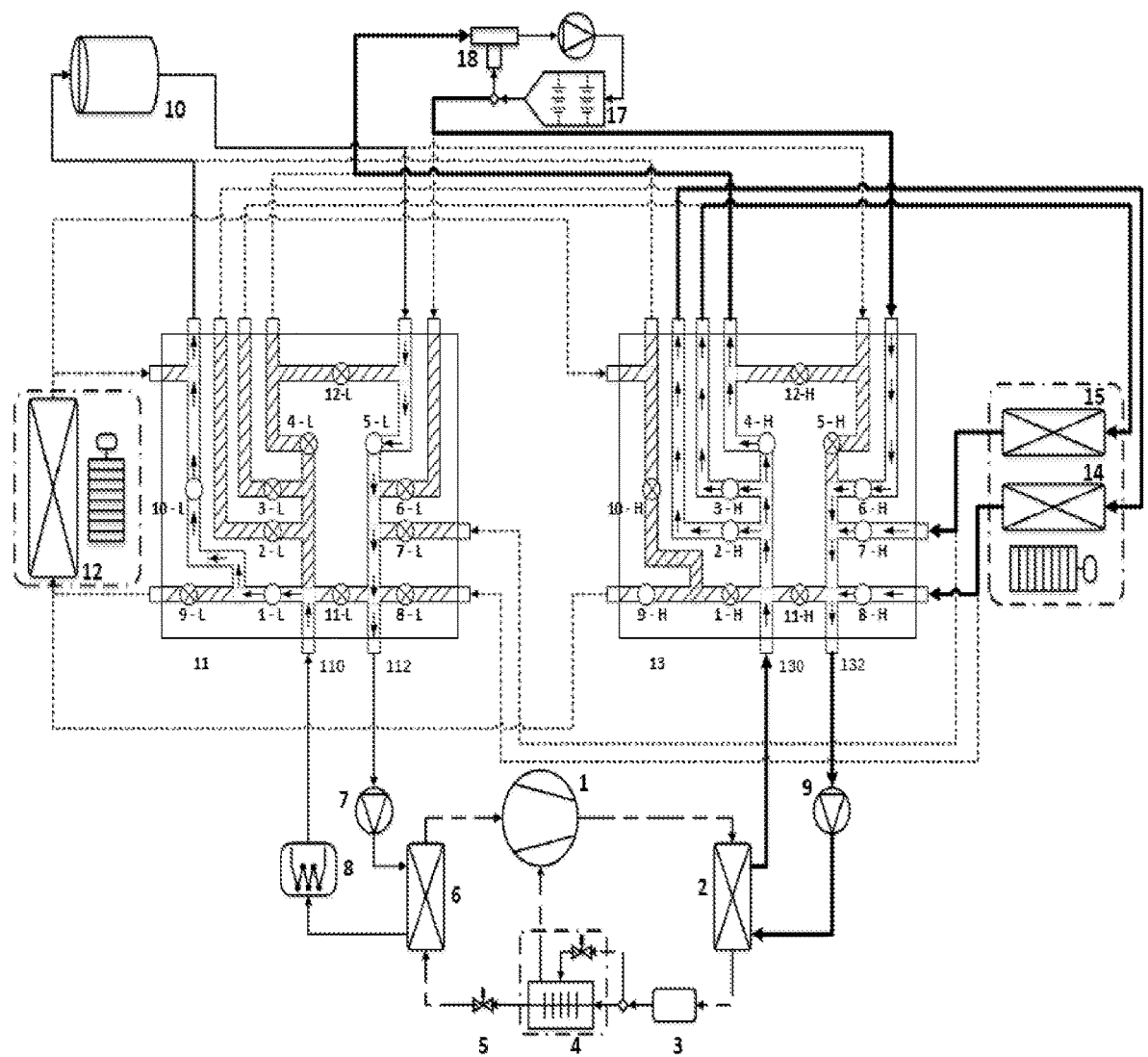
FIG. 4 is a diagram illustrating a second heating mode of the indirect heat pump system according to embodiments of the present application.

As shown in FIG. 4, the refrigerant unit in a second heating mode is the same as the refrigerant unit in the first heating mode, while only the number of the loads of the cold water handling unit 11 and the number of the loads of the hot water handling unit 13 are reallocated; one load is reduced in the cold water handling unit 11 (compared with FIG. 3, the coolant in the cold water handling unit 11 in FIG. 4 does not flow through the first load 12); one load is added in the hot water handling unit 13 (compared with FIG. 3, the coolant in the hot water handling unit 13 in FIG. 4 additionally flows through the fifth load 17); and the cold water handling unit 11 and the hot water handling unit 13 need to be reorganized.

In the hot water handling unit 13, the coolant introduced by the hot water pump 9 to pipelines at one side in the condenser 2 absorbs the heat of condensation of the refrigerant in pipelines at the other side of the condenser 2. The heated coolant flows into the hot water handling unit 13 from the hot water inlet 130. The coolant in the hot water handling unit 13 is divided into three parts. A first part of the coolant passes through the second hot water two-way valve 2-H and flows into the interior cooler from the inlet of the third load 14 to heat the air in the compartment. A second part of the coolant passes through the third hot water two-way valve 3-H and flows into the interior heater from the inlet of the fourth load 15 to heat the air in the compartment. A third part of the coolant passes through the fourth hot water two-way valve 4-H and flows into the battery pack from the inlet of the fifth load 17 to heat the battery pack. The coolant flowing out of the interior cooler, the coolant flowing out of the interior heater, and the coolant flowing out of the battery pack pass through the outlet of the third load 14, the outlet of the fourth load 15, and the outlet of the fifth load 17 respectively, return to the hot water handling unit 13, and then merge together after passing through the eighth hot water two-way valve 8-H, the seventh hot water two-way valve 7-H, and the sixth hot water two-way valve 6-H respectively. Then the merged coolant flows out from the hot water outlet 132 and returns to an inlet of the hot water pump 7 to start the next circulation.

In the cold water handling unit 11, after the heat of the coolant introduced by the cold water pump 7 to pipelines at one side in the evaporator 6 is absorbed by the refrigerant in pipelines at the other side in the evaporator 6, the temperature of the coolant lowers. The coolant passes through the PTC heater 8 and reaches the cold water inlet 110 of the cold water handling unit 11 to flow in. In the second heating mode, the PTC heater 8 does not work. The coolant in the cold water handling unit 11 flows through the first cold water two-way valve 1-L and the tenth cold water two-way valve 10-L respectively and then flows into the inlet of the drive motor from the inlet of the second load 10 to absorb the heat of the drive motor. The coolant flowing out of the drive motor passes through the outlet of the second load 10, returns to the cold water handling unit 11, passes through the fifth cold water two-way valve 5-L, flows out from the cold water outlet 112, and then returns to the inlet of the cold water pump 7 to start the next circulation.

Third Heating Mode

Figure 5:
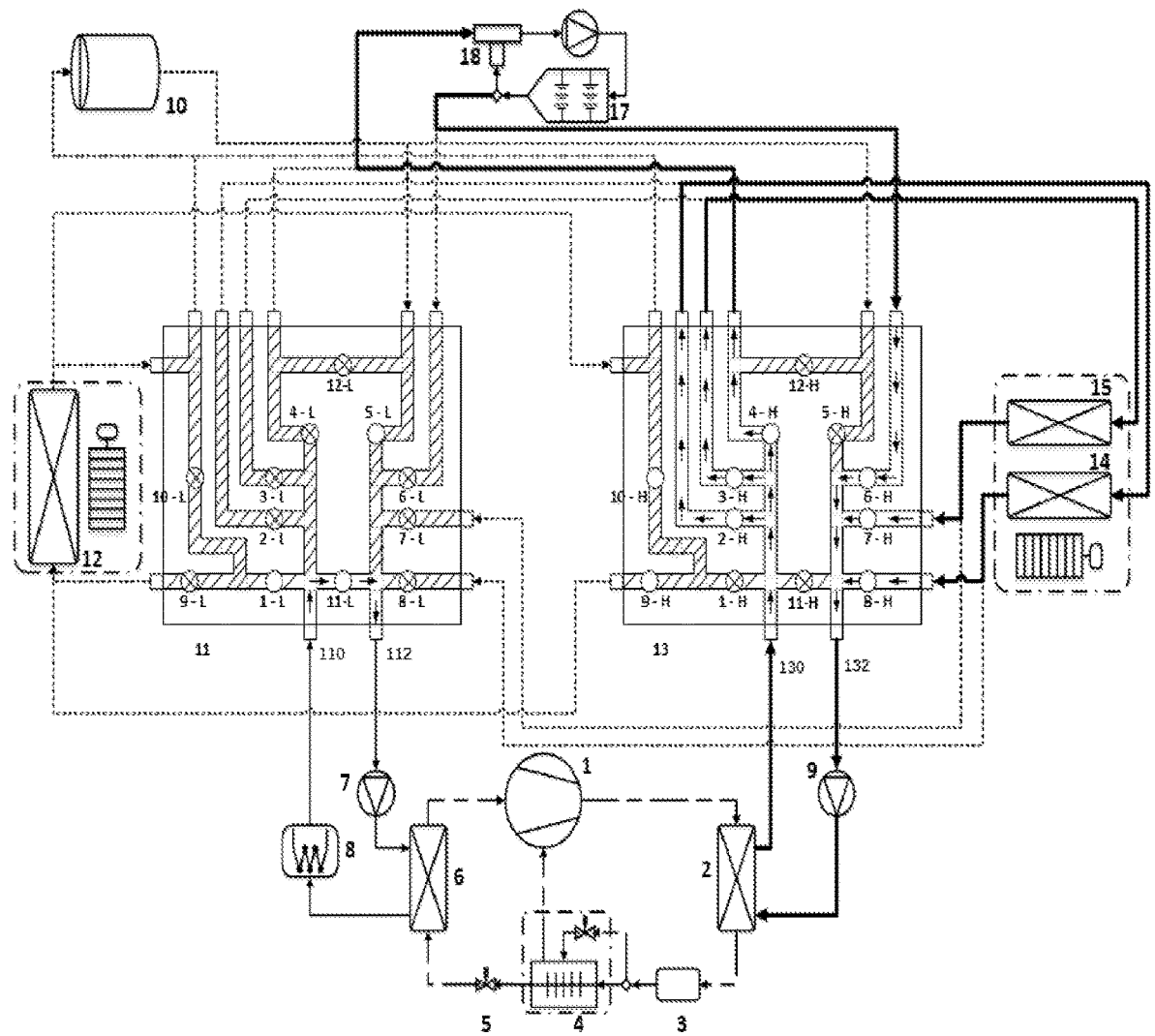
FIG. 5 is a diagram illustrating a third heating mode of the indirect heat pump system according to embodiments of the present application.

As shown in FIG. 5, the refrigerant unit in a third heating mode is the same as the refrigerant unit in the second heating mode, while only the number of loads corresponding to the cold water handling unit 11 is reallocated.

In the cold water handling unit 11, after the heat of the coolant introduced by the cold water pump 7 to pipelines at one side in the evaporator 6 is absorbed by the refrigerant in pipelines at the other side in the evaporator 6, the temperature of the coolant lowers. After the coolant is heated by the PTC heater 8, the temperature of the coolant rises. Then the coolant reaches the cold water inlet 110 of the cold water handling unit 11 to flow in. The coolant in the cold water handling unit 11 passes through the eleventh cold water two-way valve 11-L, flows out from the cold water outlet 112, and then returns to the inlet of the cold water pump 7 to start the next circulation.

The flow path of the coolant in the hot water handling unit 13 in the third heating mode is similar to the flow path of the coolant in the hot water handling unit 13 in the second heating mode and is not repeated here.

Fourth Heating Mode

Figure 6:
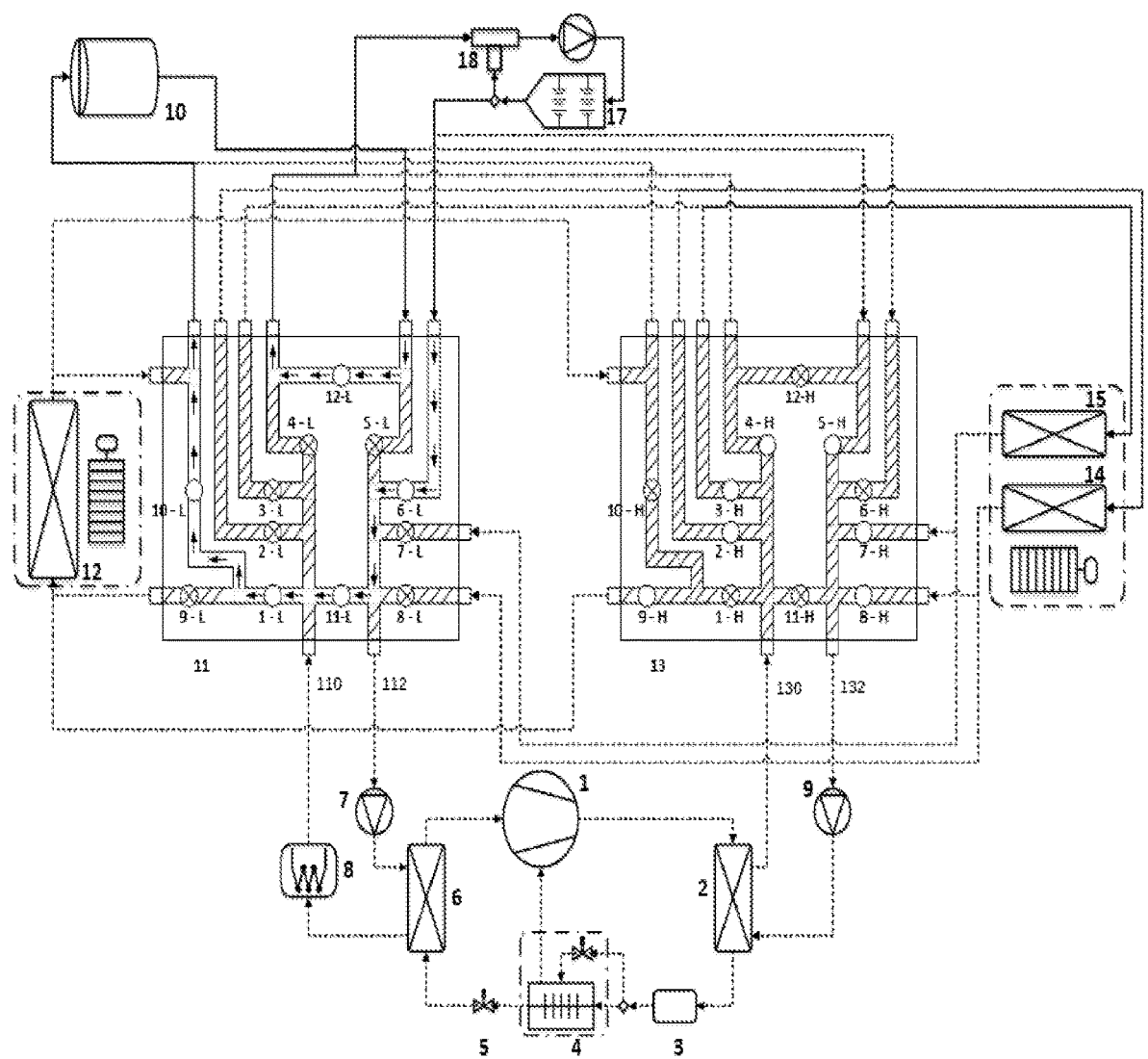
FIG. 6 is a diagram illustrating a fourth heating mode of the indirect heat pump system according to embodiments of the present application.

As shown in FIG. 6, in a fourth heating mode, the heat generated by the drive motor (that is, the second load 10) is used for heating the battery pack. In this case, the passenger compartment has no cooling or heating requirement. In this case, the refrigerant unit and the hot water handling unit 13 are each in the non-flowing state, while only the cold water handling unit 11 works.

In the cold water handling unit 11, the coolant heated by the drive motor flows out of the drive motor and returns to the cold water handling unit 11 from the outlet of the second load 10. The coolant in the cold water handling unit 11 passes through the twelfth cold water two-way valve 12-L and then flows into the battery pack from the inlet of the fifth load 17 to heat batteries in the battery pack. In this case, the battery water temperature regulating valve 18 controls the water temperature at the inlet of the battery pack by regulating the bypass flow. The coolant flowing out of the battery pack returns to the cold water handling unit 11 from the outlet of the fifth load 17, then passes through the sixth cold water two-way valve 6-L, the eleventh cold water two-way valve 11-L, the first cold water two-way valve 1-L, and the tenth cold water two-way valve 10-L sequentially, and returns to the drive motor from the inlet of the second load 10 to start the next circulation.

Cooling, Heating, and Demisting Mode

Figure 7:
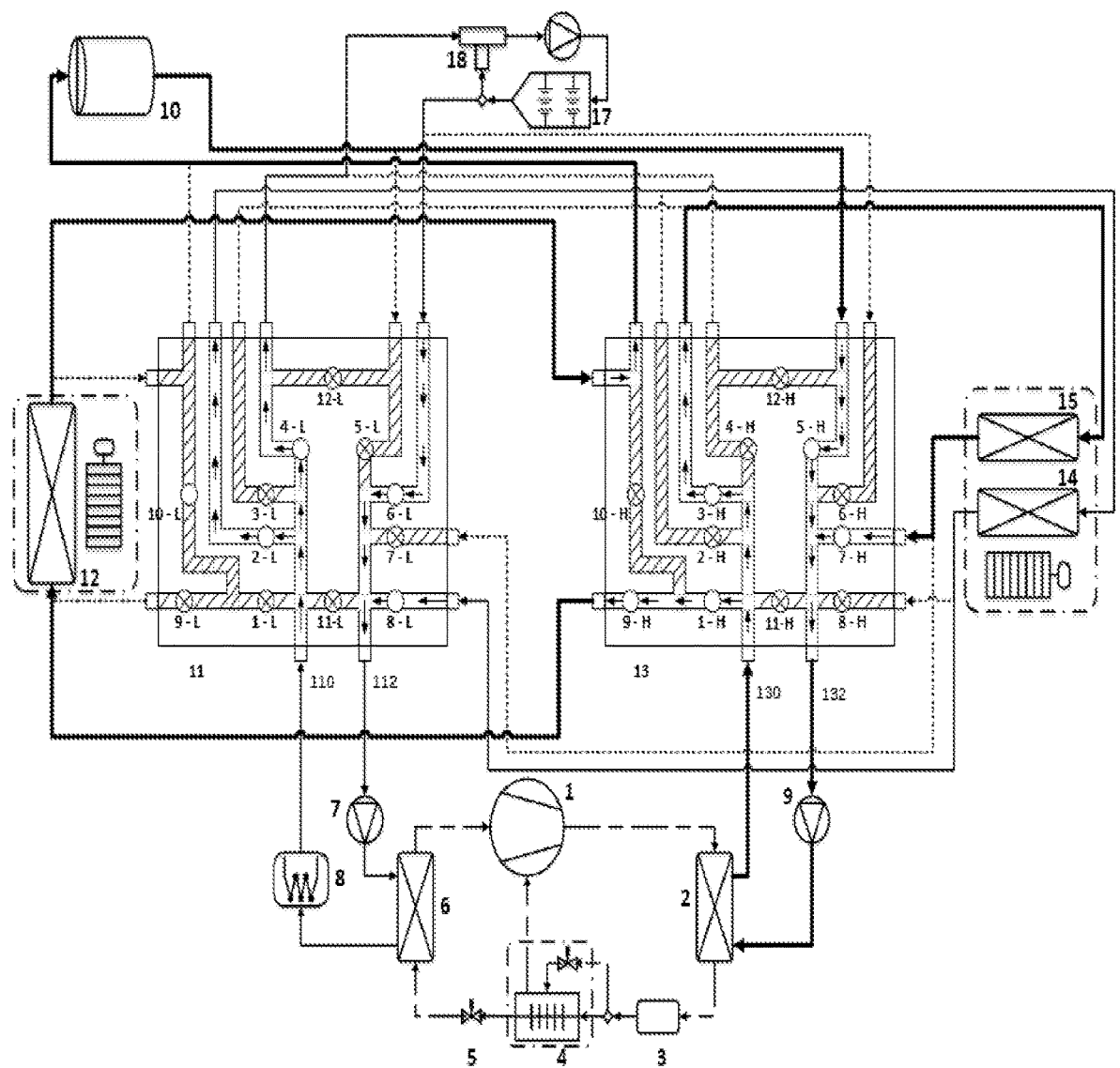
FIG. 7 is a diagram illustrating a cooling, heating, and demisting mode of the indirect heat pump system according to embodiments of the present application.

As shown in FIG. 7, the refrigerant unit in a cooling, heating, and demisting mode is the same as the refrigerant unit in the cooling mode, while only the number of the loads of the cold water handling unit 11 and the number of the loads of the hot water handling unit 13 are reallocated; one load is reduced in the cold water handling unit 11 (compared with FIG. 2, the coolant in the cold water handling unit 11 in FIG. 7 does not flow through the fourth load 15); one load is added in the hot water handling unit 13 (compared with FIG. 2, the coolant in the hot water handling unit 13 in FIG. 7 additionally flows through the fourth load 15); and the cold water handling unit 11 and the hot water handling unit 13 need to be reorganized.

In the hot water handling unit 13, the coolant is introduced to the condenser 2 by the hot water pump 9 so as to absorb the heat of condensation released by the refrigerant at the other side of the condenser 2. The heated coolant flows in from the hot water inlet 130. The high-temperature coolant in the hot water handling unit 13 is divided into two parts. One part of the coolant passes through the first hot water two-way valve 1-H and the ninth hot water two-way valve 9-H sequentially and flows into the radiator (that is, the first load 12); and after cooled by the radiator (that is, the first load 12), the coolant reaches the inlet of the drive motor (that is, the second load and flows out after cooling the drive motor. The other part of the coolant passes through the third hot water two-way valve 3-H and flows into the interior heater from the inlet of the fourth load 15 to heat the air in the passenger compartment. The coolant flowing out of the drive motor and the coolant flowing out of the interior heater pass through the outlet of the second load 10 of the hot water handling unit 13 and the outlet of the fourth load 15 of the hot water handling unit 13 respectively, flow into the hot water handling unit 13, and then merge together after passing through the fifth hot water two-way valve 5-H and the seventh hot water two-way valve 7-H respectively. Then the merged hot coolant flows out from the hot water outlet 132 and returns to the inlet of the hot water pump 9 to start the next circulation.

In the cold water handling unit 11, the coolant introduced by the cold water pump 7 to pipelines at one side in the evaporator 6 is cooled by the refrigerant in pipelines at the other side in the evaporator 6, passes through the PTC heater 8, and reaches the cold water inlet 110 of the cold water handling unit 11 to flow in. In the cooling, heating, and demisting mode, the PTC heater 8 does not work. After passing through the cold water handling unit 11, the coolant is divided into two parts. One part of the coolant passes through the second cold water two-way valve 2-L and flows into the interior cooler from the inlet of the third load 14 to cool the air in the compartment. The other part of the coolant passes through the fourth cold water two-way valve 4-L and flows into the battery pack from the inlet of the fifth load 17 to cool batteries in the battery pack. In this case, the battery water temperature regulating valve 18 controls the water temperature at the inlet of the battery pack by regulating the bypass flow. The coolant flowing out of the interior cooler and the coolant flowing out of the battery pack pass through the outlet of the third load 14 and the outlet of the fifth load 17 respectively, return to the cold water handling unit 11, and then merge together after passing through the eighth cold water two-way valve 8-L and the sixth cold water two-way valve 6-L. Then the merged coolant flows out from the cold water outlet 112 and finally returns to the inlet of the cold water pump 7 to start the next circulation.

Radiator Defrosting Mode

Figure 8:
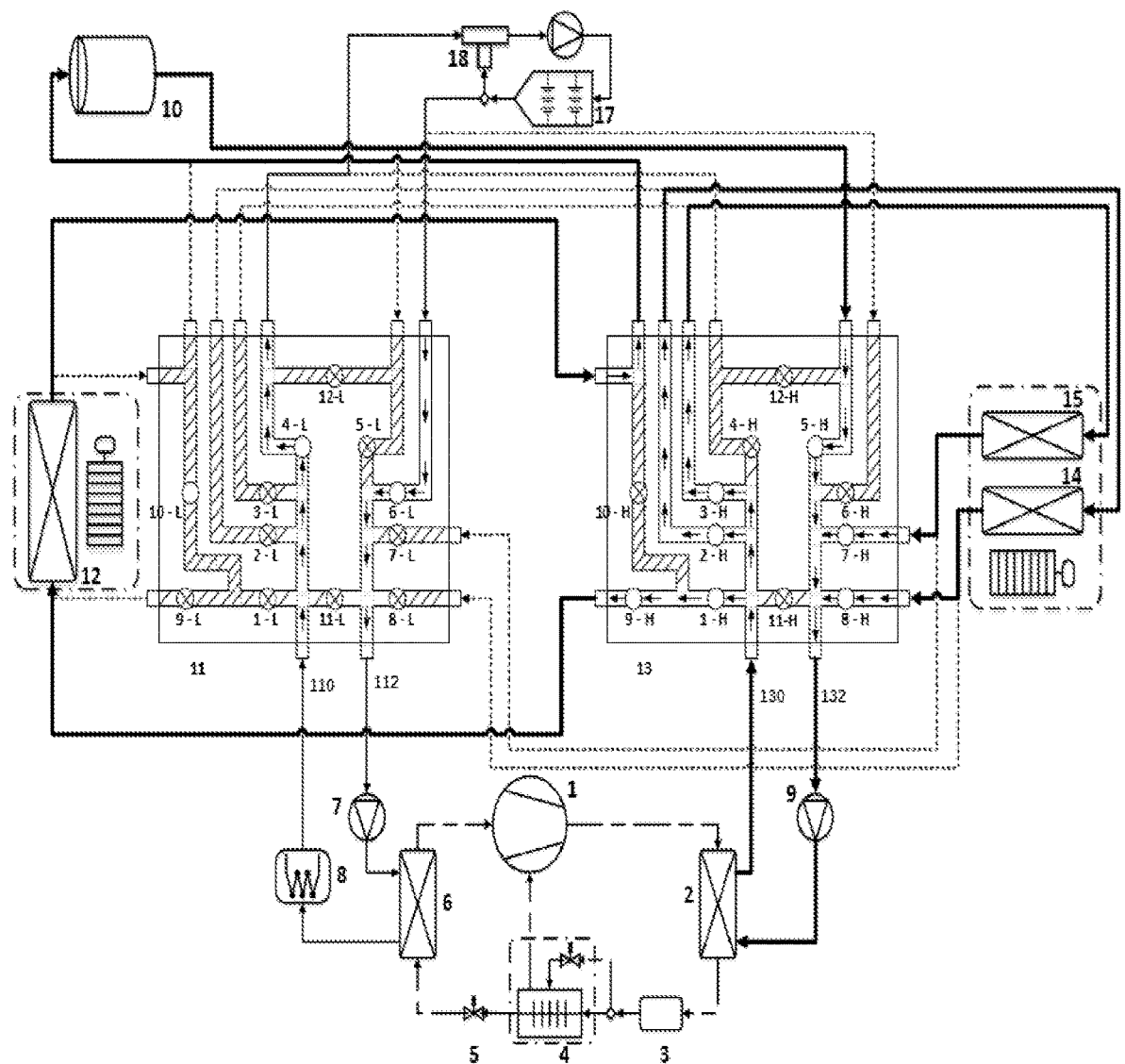
FIG. 8 is a diagram illustrating a radiator defrosting mode of the indirect heat pump system according to embodiments of the present application.

As shown in FIG. 8, the refrigerant unit in a radiator defrosting mode is the same as the refrigerant unit in the first heating mode, while the number of the loads of the cold water handling unit 11 and the number of the loads of the hot water handling unit 13 need to be reallocated; one load is reduced in the cold water handling unit 11 (compared with FIG. 3, the coolant in the cold water handling unit 11 in FIG. 8 does not flow through the first load 12 and the second load 10); one load is added in the hot water handling unit 13 (compared with FIG. 3, the coolant in the hot water handling unit 13 in FIG. 8 additionally flows through the first load 12 and the second load 10); and the cold water handling unit 11 and the hot water handling unit 13 need to be reorganized.

In the hot water handling unit 13, the coolant introduced by the hot water pump 9 to pipelines at one side in the condenser 2 absorbs the heat of condensation of the refrigerant in pipelines at the other side of the condenser 2. The heated coolant flows into the hot water handling unit 13 from the hot water inlet 130. The coolant in the hot water handling unit 13 is divided into three parts. A first part of the coolant passes through the second hot water two-way valve 2-H and flows into the interior cooler from the inlet of the third load 14 to heat the air in the compartment. A second part of the coolant passes through the third hot water two-way valve 3-H and flows into the interior heater from the inlet of the fourth load 15 to heat the air in the compartment. A third part of the coolant passes through the first hot water two-way valve 1-H and the ninth hot water two-way valve 9-H and flows into the radiator from the inlet of the first load 12 to release heat and melt the frost on the radiator fins. Then the coolant passes through the hot water handling unit 13 and reaches the inlet of the drive motor. The coolant flowing out of the interior cooler, the coolant flowing out of the interior heater, and the coolant flowing out of the drive motor pass through the outlet of the third load 14, the outlet of the fourth load 15, and the outlet of the second load 10 respectively, return to the hot water handling unit 13, and then merge together after passing through the eighth hot water two-way valve 8-H, the seventh hot water two-way valve 7-H, and the fifth hot water two-way valve 5-H respectively. Then the merged coolant flows out from the hot water outlet 132 and returns to the inlet of the hot water pump 9 to start the next circulation.

In the cold water handling unit 11, after the heat of the coolant introduced by the cold water pump 7 to pipelines at one side in the evaporator 6 is absorbed by the refrigerant in pipelines at the other side in the evaporator 6, the temperature of the coolant lowers. The coolant passes through the PTC heater 8 and reaches the cold water inlet 110 of the cold water handling unit 11 to flow in. In the radiator defrosting mode, the PTC heater 8 does not work. The coolant in the cold water handling unit 11 passes through the fourth cold water two-way valve 4-L and then flows into the battery pack from the inlet of the fifth load 17 to absorb the heat of batteries in the battery pack. The coolant flowing out of the battery pack passes through the outlet of the fifth load 17, returns to the cold water handling unit 11, passes through the sixth cold water two-way valve 6-L, flows out from the cold water outlet 112, and then returns to the inlet of the cold water pump 7 to start the next circulation.

Those of ordinary skill in the art can make various modifications, adaptations and substitutions without departing from the scope of the present application.

What is claimed is:

1. An indirect heat pump system, comprising:
   a refrigerant unit comprising a compressor, a condenser, a throttle valve, and an evaporator, wherein an outlet of the compressor communicates with a first inlet of the condenser, a first outlet of the condenser communicates with a first inlet of the evaporator through the throttle valve, and a first outlet of the evaporator communicates with an inlet of the compressor;
   a cold water handling unit, wherein a cold water inlet of the cold water handling unit communicates with a second outlet of the evaporator, a cold water outlet of the cold water handling unit communicates with a second inlet of the evaporator, the cold water handling unit is connected to a plurality of loads in parallel, and a plurality of cold water two-way valves are disposed in pipelines of the cold water handling unit and are configured to control on and off of cold water in the plurality of loads; and
   a hot water handling unit, wherein a hot water inlet of the hot water handling unit communicates with a second outlet of the condenser, a hot water outlet of the hot water handling unit communicates with a second inlet of the condenser, the hot water handling unit is connected to the plurality of loads in parallel, and a plurality of hot water two-way valves are disposed in pipelines of the hot water handling unit and are configured to control on and off of hot water in the plurality of loads,
   wherein the plurality of hot water two-way valves correspond to the plurality of cold water two-way valves in a one-to-one manner and are interlocked with the plurality of cold water two-way valves in terms of on and off states;
   wherein the cold water handling unit comprises a plurality of inflow cold water branches communicating with the cold water inlet and a plurality of outflow cold water branches communicating with the cold water outlet, and the plurality of inflow cold water branches and the plurality of outflow cold water branches communicate with the plurality of loads and are configured to introduce the cold water to the plurality of loads;
   wherein the plurality of inflow cold water branches comprise a first cold water branch, a second cold water branch, a third cold water branch, a fourth cold water branch, and a fifth cold water branch; two ends of the first cold water branch communicate with the cold water inlet and an inlet of a first load respectively; one end of the second cold water branch communicates with the first cold water branch, and another end of the second cold water branch communicates with an outlet of the first load and an inlet of a second load; two ends of the third cold water branch communicate with the cold water inlet and an inlet of a third load respectively; two ends of the fourth cold water branch communicate with the cold water inlet and an inlet of a fourth load respectively; and two ends of the fifth cold water branch communicate with the cold water inlet and an inlet of a fifth load respectively; and the plurality of outflow cold water branches comprise a sixth cold water branch, a seventh cold water branch, an eighth cold water branch, and a ninth cold water branch; two ends of the sixth cold water branch communicate with the cold water outlet and an outlet of the second load respectively; two ends of the seventh cold water branch communicate with the cold water outlet and an outlet of the fifth load respectively; two ends of the eighth cold water branch communicate with the cold water outlet and an outlet of the fourth load respectively; and two ends of the ninth cold water branch communicate with the cold water outlet and an outlet of the third load respectively.

2. The indirect heat pump system according to claim 1, wherein a first cold water two-way valve and a ninth cold water two-way valve are disposed on the first cold water branch, a joint between the first cold water branch and the second cold water branch is located between the first cold water two-way valve and the ninth cold water two-way valve, a tenth cold water two-way valve is disposed on the second cold water branch, a second cold water two-way valve is disposed on the third cold water branch, a third cold water two-way valve is disposed on the fourth cold water branch, a fourth cold water two-way valve is disposed on the fifth cold water branch, a fifth cold water two-way valve is disposed on the sixth cold water branch, a sixth cold water two-way valve is disposed on the seventh cold water branch, a seventh cold water two-way valve is disposed on the eighth cold water branch, an eighth cold water two-way valve is disposed on the ninth cold water branch, the fifth cold water branch communicates with the sixth cold water branch through a tenth cold water branch, a twelfth cold water two-way valve is disposed on the tenth cold water branch, the first cold water branch communicates with the ninth cold water branch through an eleventh cold water branch, and an eleventh cold water two-way valve is disposed on the eleventh cold water branch.

3. The indirect heat pump system according to claim 1, further comprising a PTC heater disposed between the cold water inlet and the second outlet of the evaporator and configured to heat the cold water.

4. The indirect heat pump system according to claim 1, further comprising a cold water pump disposed between the cold water outlet and the second inlet of the evaporator and configured to convey the cold water.

5. The indirect heat pump system according to claim 1, wherein the hot water handling unit comprises a plurality of inflow hot water branches communicating with the hot water inlet and a plurality of outflow hot water branches communicating with the hot water outlet, and the plurality of inflow hot water branches and the plurality of outflow hot water branches communicate with the plurality of loads and are configured to introduce the hot water to the plurality of loads.

6. The indirect heat pump system according to claim 5, wherein the plurality of inflow hot water branches comprise a first hot water branch, a second hot water branch, a third hot water branch, a fourth hot water branch, and a fifth hot water branch; two ends of the first hot water branch communicate with the hot water inlet and the inlet of the first load respectively; one end of the second hot water branch communicates with the first hot water branch, and another end of the second hot water branch communicates with the outlet of the first load and the inlet of the second load; two ends of the third hot water branch communicate with the hot water inlet and the inlet of the third load respectively; two ends of the fourth hot water branch communicate with the hot water inlet and the inlet of the fourth load respectively; and two ends of the fifth hot water branch communicate with the hot water inlet and the inlet of the fifth load respectively; and the plurality of outflow hot water branches comprise a sixth hot water branch, a seventh hot water branch, an eighth hot water branch, and a ninth hot water branch; two ends of the sixth hot water branch communicate with the hot water outlet and the outlet of the second load respectively; two ends of the seventh hot water branch communicate with the hot water outlet and the outlet of the fifth load respectively; two ends of the eighth hot water branch communicate with the hot water outlet and the outlet of the fourth load respectively; and two ends of the ninth hot water branch communicate with the hot water outlet and the outlet of the third load respectively.

7. The indirect heat pump system according to claim 6, wherein a first hot water two-way valve and a ninth hot water two-way valve are disposed on the first hot water branch, a joint between the first hot water branch and the second hot water branch is located between the first hot water two-way valve and the ninth hot water two-way valve, a tenth hot water two-way valve is disposed on the second hot water branch, a second hot water two-way valve is disposed on the third hot water branch, a third hot water two-way valve is disposed on the fourth hot water branch, a fourth hot water two-way valve is disposed on the fifth hot water branch, a fifth hot water two-way valve is disposed on the sixth hot water branch, a sixth hot water two-way valve is disposed on the seventh hot water branch, a seventh hot water two-way valve is disposed on the eighth hot water branch, an eighth hot water two-way valve is disposed on the ninth hot water branch, the fifth hot water branch communicates with the sixth hot water branch through a tenth hot water branch, a twelfth hot water two-way valve is disposed on the tenth hot water branch, the first hot water branch communicates with the ninth hot water branch through an eleventh hot water branch, and an eleventh hot water two-way valve is disposed on the eleventh hot water branch.

8. The indirect heat pump system according to claim 1, further comprising a hot water pump disposed between the hot water outlet and the second inlet of the condenser and configured to convey the hot water.

\* \* \* \* \*